United States Patent [19]

Inoo

[11] Patent Number: 5,600,403
[45] Date of Patent: Feb. 4, 1997

[54] MONITOR SYSTEM FOR MONITORING STATE OF IMAGE FORMING DEVICE

[75] Inventor: Masaaki Inoo, Yokohama, Japan

[73] Assignee: Canon Kabushiki Kaisha, Tokyo, Japan

[21] Appl. No.: 359,813

[22] Filed: Dec. 20, 1994

[30] Foreign Application Priority Data

Dec. 24, 1993 [JP] Japan .................. 5-327261

[51] Int. Cl.$^6$ .................................................. G03G 21/00
[52] U.S. Cl. .................................................. 399/8; 399/10
[58] Field of Search .................................. 355/200, 202, 355/203, 204, 205, 206, 208, 209, 210

[56] References Cited

U.S. PATENT DOCUMENTS

| | | | |
|---|---|---|---|
| 5,057,866 | 10/1991 | Hill, Jr. et al. | 355/200 |
| 5,077,582 | 12/1991 | Kravette et al. | 355/206 |
| 5,300,980 | 4/1994 | Maekawa et al. | 355/204 |
| 5,325,156 | 6/1994 | Ulinski | 355/209 |
| 5,365,310 | 11/1994 | Jenkins et al. | 365/202 |
| 5,373,349 | 12/1994 | Ito | 355/202 |
| 5,420,667 | 5/1995 | Kaneko et al. | 355/206 |

*Primary Examiner*—Sandra L. Brase
*Attorney, Agent, or Firm*—Fitzpatrick, Cella, Harper & Scinto

[57] ABSTRACT

A monitor system comprises a detector unit for detecting the state of an image forming device, and a transmitter unit for transmitting the status data representing the state to a monitor device upon a state change being detected by the detector unit. If the transmitter unit fails to transmit the status data, it stores the status data and transmits the status data stored upon the new state change being detected by the detector unit. This allows for the secure transmission of the status data of the image forming device which has not been transmitted to the monitor device due to a temporary malfunction of the line.

24 Claims, 5 Drawing Sheets

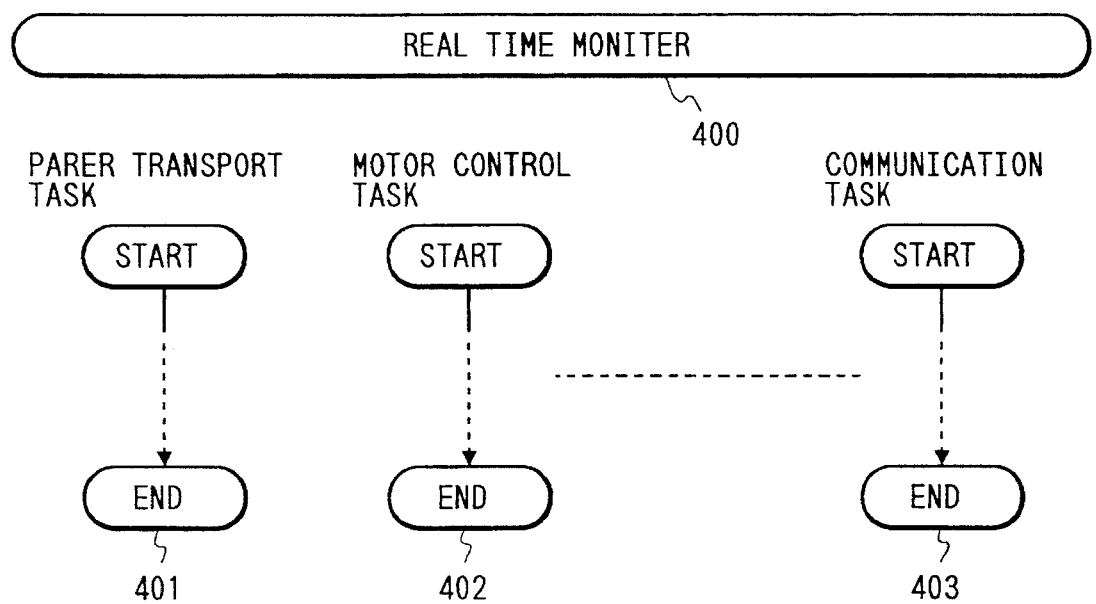
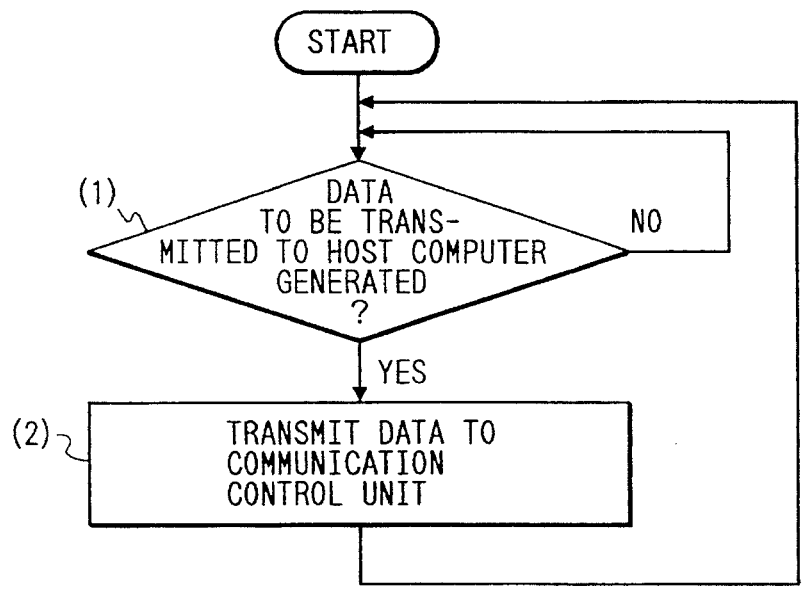

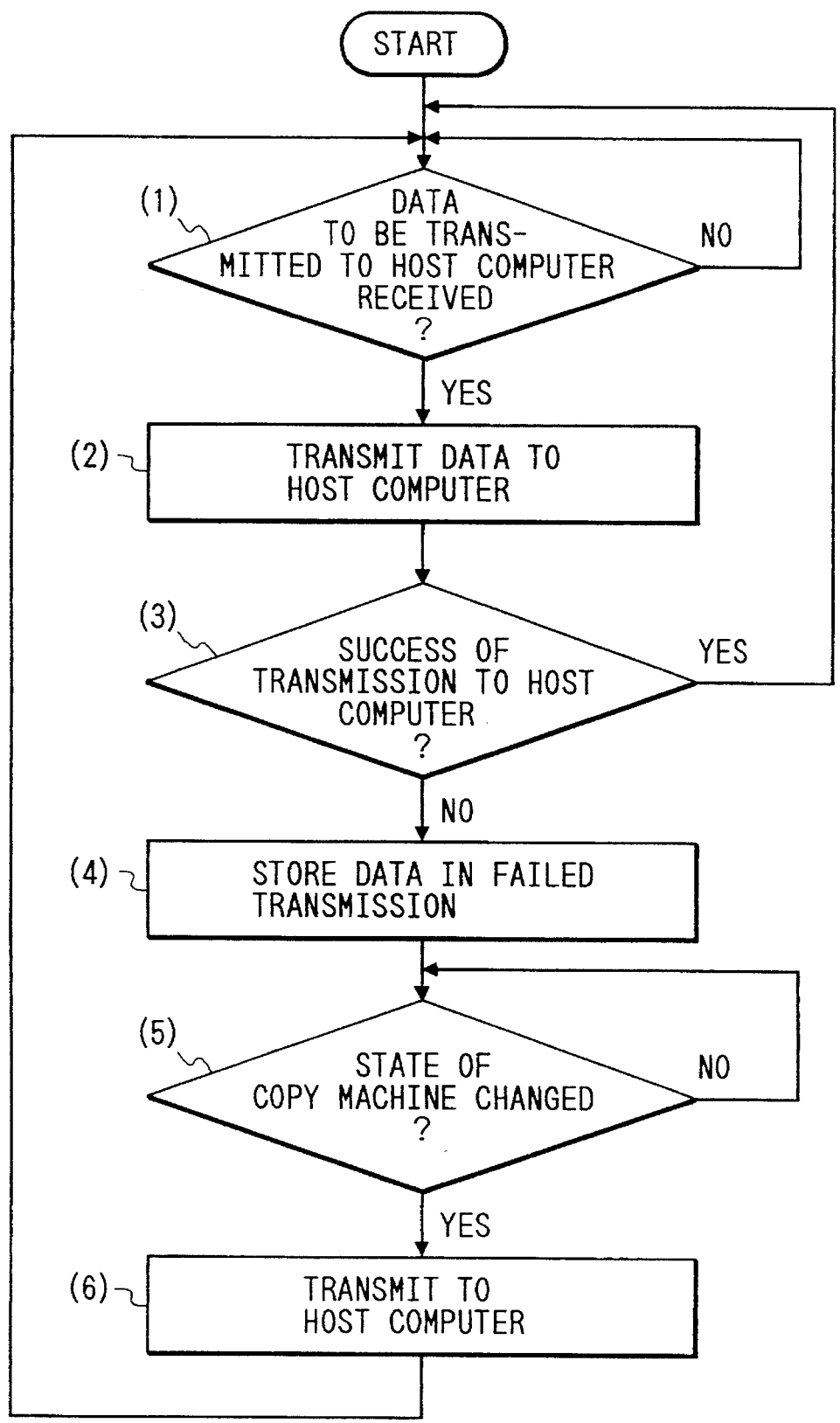

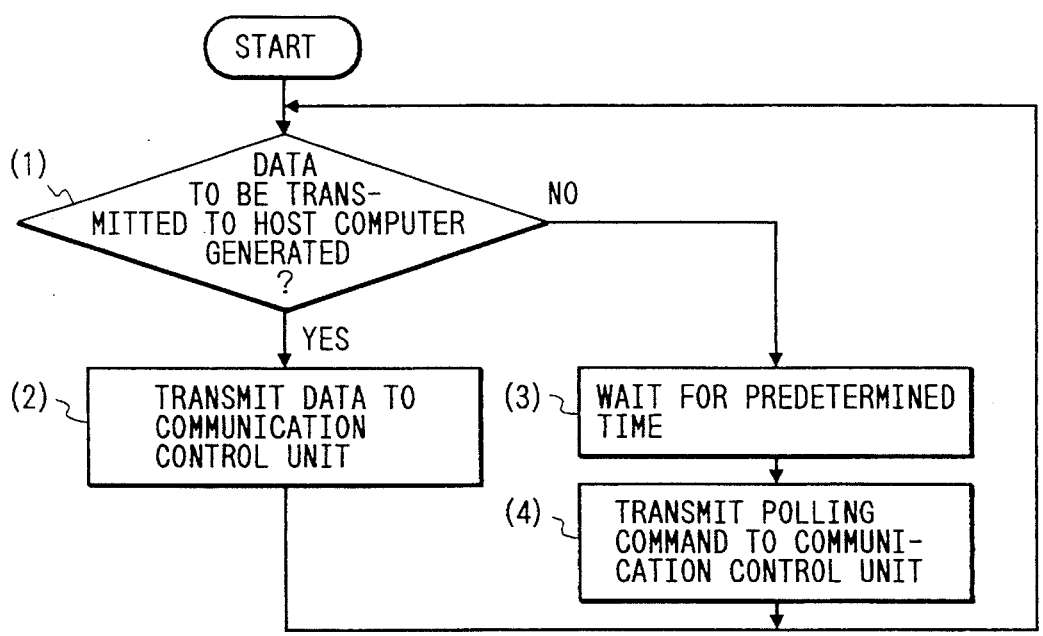
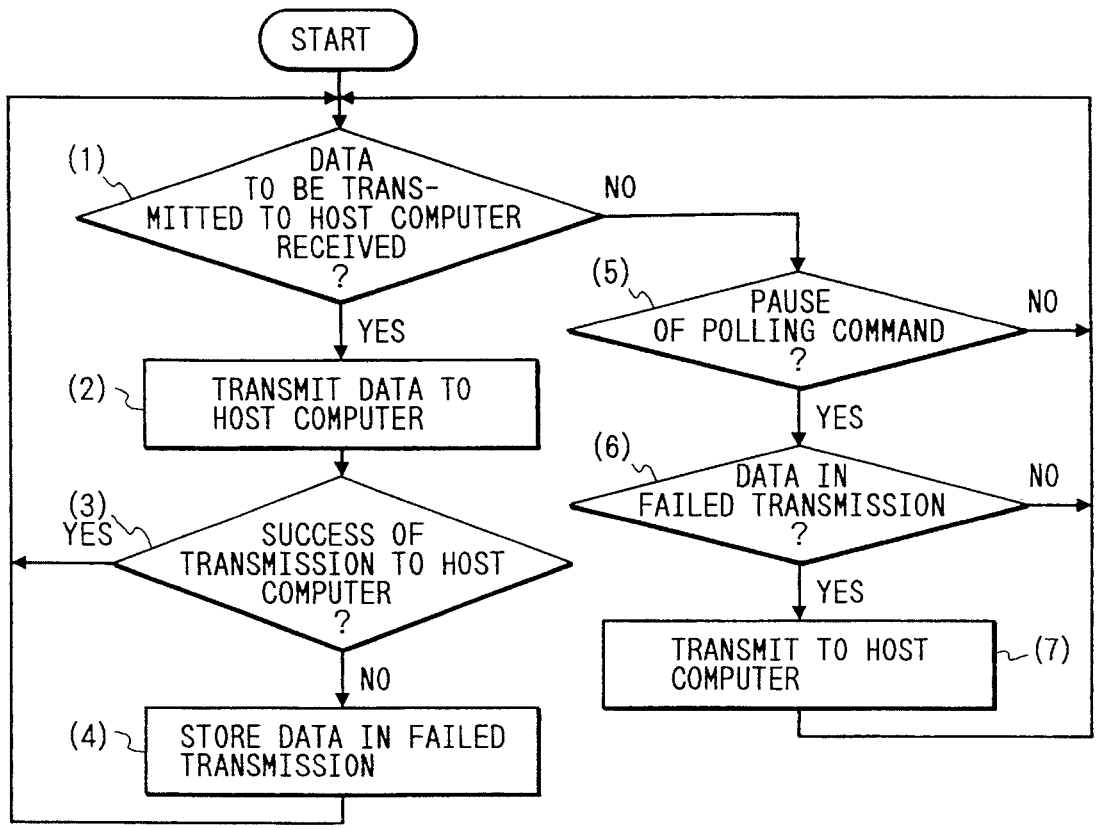

MONITOR SYSTEM FOR MONITORING STATE OF IMAGE FORMING DEVICE

BACKGROUND OF THE INVENTION

1. Field of the Invention

The present invention relates to a monitor system for monitoring the state of an image forming device.

2. Related Background Art

Recently, a system has been proposed which monitors a plurality of copying machines by a host computer installed at a service center. This system transmits the status data via a public line to the host computer when a malfunction occurs on a copying machine. However, when the line fails in transmission due to a temporary malfunction, its data is discarded or directly held on the copying machine.

Accordingly, this system has a drawback that if the line has any fault, the service center can not quickly respond. Also, it has a further drawback that if the copying machine has any malfunction, the user of the copying machine makes no attempt to notify the service center that the malfunction has occurred, anticipating that the data concerning malfunction will be automatically sent to the service center, so that the measures may be delayed.

SUMMARY OF THE INVENTION

It is an object of the present invention to provide a system in which the above-mentioned drawbacks have been resolved.

It is another object of the invention to provide a system in which if the data passed from an image forming device to a host computer fails in transmission, the system stores the data and sends the stored data to the host computer at a predetermined timing.

Also, it is a further object of the invention to provide a system in which even if the data concerning an image forming device can not be sent to a host computer due to any fault on the communication line between the image forming device and the host computer, the data can be always sent later.

Other objects and features of the present invention will be apparent from the following description and the accompanying drawings.

BRIEF DESCRIPTION OF THE DRAWINGS

FIG. 4 is a task configuration diagram showing generally a software for the copy control unit as shown in FIG. 1.

FIG. 5 is a flowchart showing an example of a first communication task processing procedure with the copy control unit as shown in FIG. 3.

FIG. 6 is a flowchart showing an example of a first communication processing procedure with the communication control unit as shown in FIG. 1.

FIG. 7 is a flowchart showing an example of a second communication task processing procedure with the copy control unit as shown in FIG. 3.

FIG. 8 is a flowchart showing an example of a second communication processing procedure with the communication control unit as shown in FIG. 1.

DETAILED DESCRIPTION OF THE PREFERRED EMBODIMENTS

[First Embodiment]

Figure 1:
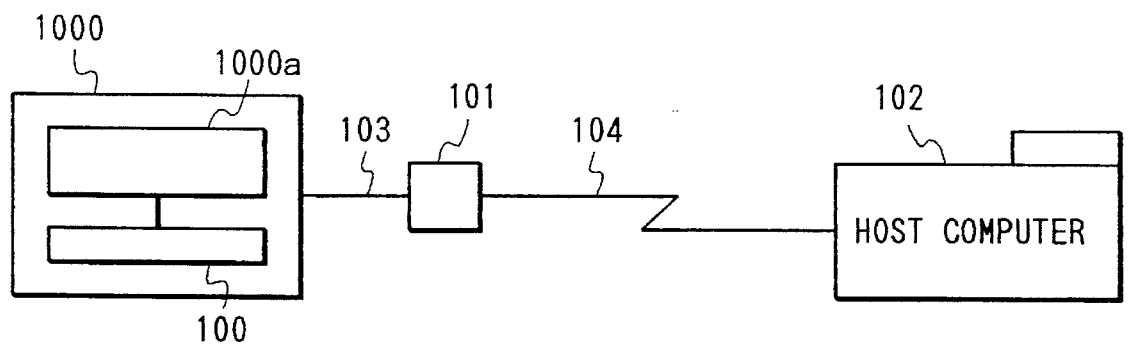
FIG. 1 is a block diagram for explaining the schematic configuration of a copying machine management system according to one embodiment of the invention.

FIG. 1 is a block diagram for explaining the schematic configuration of a copying apparatus management system according to one embodiment of the present invention.

In the figure, 1000 is a main body of a copying machine, 1000a is a copying unit for copying the original, 100 is a copy control unit for controlling the copying unit of analog or digital type to form the monochrome or color image by performing an electrophotographic process, for example, and 101 is a communication control unit for making data communication between the copy control unit 100 and a host computer 102.

Note that the host computer 102 monitors the copying machine for malfunction or administers the copying machine by storing a variety of data of the copy control unit 100. Specifically, data sent from the copy control unit 100 to the host computer represents the state of the copying machine, such as the status data of a malfunction which has occurred on the copying machine 1000, or the number of jams that have occurred before.

103 is a first communication line for effecting the serial communication, 104 is a second communication line such as the public line, which is used for the data communication between the communication control unit 101 and the host computer 102.

Figure 2:
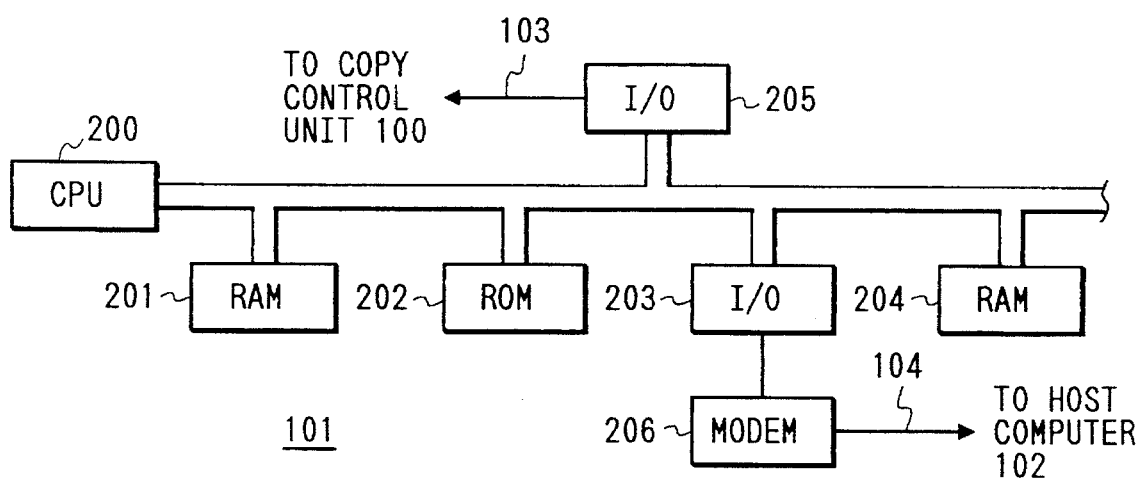
FIG. 2 is a detailed block diagram for explaining the internal configuration of a communication control unit as shown in FIG. 1.

FIG. 2 is a detailed block diagram for explaining the internal configuration of the communication control unit 101 as shown in FIG. 1.

In the figure, 200 is a CPU for controlling the whole device, 201 is a RAM for use as a working area necessary for the CPU 200 to operate, 202 is a ROM for storing the programs which instructs the CPU 200 to operate, and 203 is a serial interface (I/O) for the communication with a modem 206. 204 is a nonvolatile RAM for storing the copying machine management data in tried but failed transmission from the copy control unit 1000 to the host computer 102, and 205 is a serial interface (I/O) for the communication with the copy control unit 100.

In a copying apparatus management system as above constituted, the CPU 200 in the communication control unit 101 detects a state change in the copy control unit 100, and in accordance with the state change, sends the data in failed transmission to the host computer which has been stored in the RAM 204 to the host computer 102. This allows the management data of the copying machine 1000 in failed transmission to be notified to the host computer.

Also, the CPU 200, upon detecting a change in the power on/off state for the copy control unit 100, causes the data stored in the RAM 204 to be sent to the host computer 102.

This allows the data in failed transmission to be necessarily notified to the host computer 102 every time the power of the copying machine 1000 is turned on.

Further, the communication control unit 101, every time receiving the management data of the copying machine 1000 from the copy control unit 100, also sends the management data in failed transmission which has been stored in the RAM 204 to the host computer 102. This allows the management data in failed transmission to the host computer 102 which has been previously received from the copy control unit 100 to be necessarily notified to the host computer 102, every time the new management data from the copy control unit 100 is received.

Figure 3:
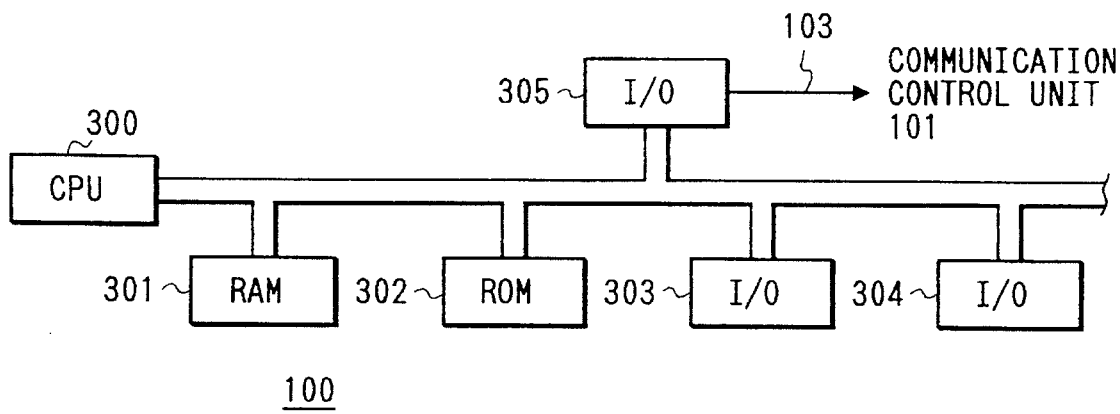
FIG. 3 is a detailed block diagram for explaining the internal configuration of a copy control unit as shown in FIG. 1.

FIG. 3 is a detailed block diagram for explaining the internal configuration of the copy control unit 100 as shown in FIG. 1.

In the figure, 300 is a CPU for controlling the operation of the copying machine 1000, 301 is a RAM which is a main storage for use as a working storage area, 302 is a ROM for storing the control procedures (control programs) for the copying machine 1000, 303 is an input/output interface (I/O) for controlling various types of motor, 304 is an input/output interface (I/O) for reading the state of various types of sensor, and 305 is a serial interface (I/O) for effecting the communication with the communication control unit 101.

FIG. 4 is a task configuration diagram showing generally software of the copy control unit 100 as shown in FIG. 1.

As shown in this figure, the software of the copying machine 1000 has a task corresponding to each control object respective tasks being parallel processed under the control of a real time monitor 400. The tasks include a paper transport task 401, a motor control task 402, and a communication task 403.

And the communication task 403 controls the communication between the copy control unit 100 and the communication control unit 101.

If the communication control unit 101 tries to send the data to the host computer 102 but fails in transmission, the communication control unit 101 stores its data in the RAM 204 within the communication control unit 101, and tries to transfer the data stored to the host computer 102 at the timing when the power of the copying machine is turned on or off.

Referring now to FIG. 5, the communication task processing operation of the copying machine 1000 will be described below.

FIG. 5 is a flowchart showing an example of a first communication task processing procedure with the copy control unit 100 as shown in FIG. 3. Note that (1), (2) shows each step.

The CPU 300 monitors the occurrence of an event to be transmitted to the host computer 102, or data to be transmitted thereto, at all times (1). And if any event occurs, the CPU 300 sends data through the input/output interface 305 to the communication control unit 101 (2). Then, the procedure returns to step (1) to repeat the same processing.

Referring now to a flowchart of FIG. 6, the control operation of the communication control unit 101 in the copying apparatus management system according to the present invention will be described below.

FIG. 6 is a flowchart showing an example of a firt communication processing procedure with the communication control unit 101 as shown in FIG. 1. Note that (1) to (6) shows each step.

First, the procedure waits for data from the copying machine 1000, that is, data to be transmitted to the host computer 102, to be received in the idle state (1). If data is received, data is transmitted to the host computer 102 (2). And the success of data transmission is judged at step (3), in which if the failed transmission is judged, the data is temporarily stored in the RAM 204 (4). Thereafter, the state change of the copying machine 1000 is monitored (5).

The state change of the copying machine 1000 is passed through the first communication unit 103 by a specific status command to the communication control unit 101. And when the power of the copying machine 1000 is turned on or off, a status command indicating a change in the power on/off state, if any, is passed from the copy control unit 100 to the communication control unit 101, as the communication function of the copy control unit 100 can also normally operate in the power-off state. At step (5), the communication control unit 101, upon receiving the status command, transmits data stored in the RAM 204 to the host computer 102 (6). The procedure returns to step (1) to repeat the same processing.

It will be appreciated that at step (4), the date data indicating the day and time when data was received from the copying machine 1000, i.e., the day and time when the state change occurred, may be stored with the received data, and transmitted later with the status data.

[Second Embodiment]

In a second embodiment, a copying machine 1000 sends a polling command to a communication control unit 101 at a predetermined time interval in the normal idle state. This embodiment has a feature that when the communication control unit 101 fails to transmit data to the host computer, it stores the data in a RAM 204 within the communication control unit 101, and when the polling command from the copying machine 1000 is interrupted beyond a predetermined time period, the communication control unit 101 sends the data stored in the RAM 204 to the host computer 102, considering that the copying machine 1000 has malfunctioned. A processing taken in such cases will be described below.

FIG. 7 is a flowchart showing an example of a second communication task processing procedure with the communication control unit 100 as shown in FIG. 3. Note that (1) to (4) shows each step.

First, the CPU 300 monitors the occurrence of an event to be transmitted to the host computer 102, or data to be transmitted thereto, at all times (1). And if any event occurs, the CPU 300 sends data through the I/O 305 to the communication control unit (2).

On the other hand, if no event occurs in judgement at step (1), the CPU waits for a fixed time period (3), and then sends a polling command (4). The procedure returns to step (1) to repeat the same processing.

FIG. 8 is a flowchart showing an example of a second communication processing procedure with the communication control unit 101 as shown in FIG. 1. Note that (1) to (6) shows each step, and this flowchart shows the operation of a software of the communication control unit.

First, the CPU waits for data from the copying machine 1000 in the idle state (1). If data is received, data is transmitted to the host computer 102 (2). And if the data transmission fails (3), the data is temporarily stored in the RAM 204 (4). Then, the procedure returns to step (1).

On the other hand, if no data is received at step (1), the pause of polling command beyond a predetermined time period in the idle state is checked (5). If any polling command is not received beyond the predetermined time period, any data in failed transmission within a storage device (RAM 204) is checked (6), and if any, the data is transmitted to the host computer 102.

[Third Embodiment]

A third embodiment has a feature that when a communication control unit 101 fails to transmit data to a host computer 102, it stores the data in a RAM 204 within the communication control unit 101, and when it receives next data to be transmitted to the host computer 102 from the copying machine 1000, the next data is transmitted together with the data in failed transmission which has been stored within the RAM 204. A processing taken in such cases will be described below.

Figure 9:
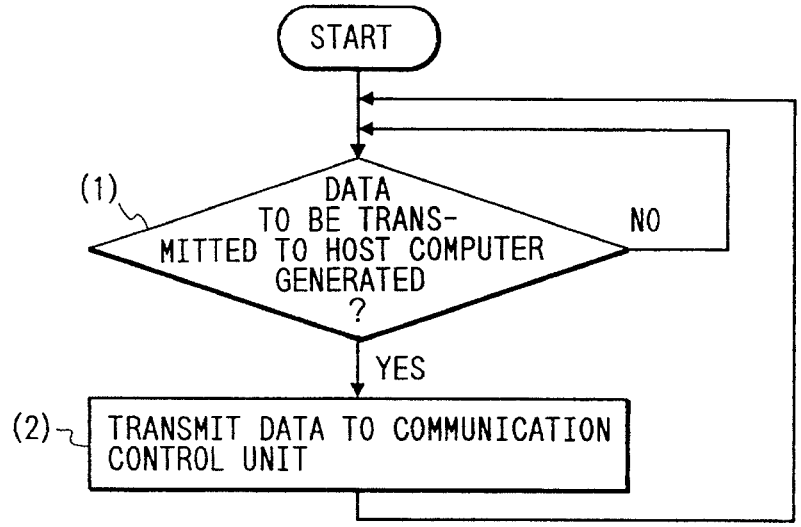
FIG. 9 is a flowchart showing an example of a third communication task processing procedure with the copy control unit as shown in FIG. 3.

FIG. 9 is a flowchart showing an example of a third communication task processing procedure with the communication control unit 100 as shown in FIG. 3. Note that (1), (2) shows each step.

First, a CPU 300 monitors the occurrence of an event to be transmitted to the host computer 102 at all times (1). And if any event occurs, the CPU 300 sends data through an input/output interface 305 to the communication control unit (2). Then, the procedure returns to step (1) to repeat the same processing.

Figure 10:
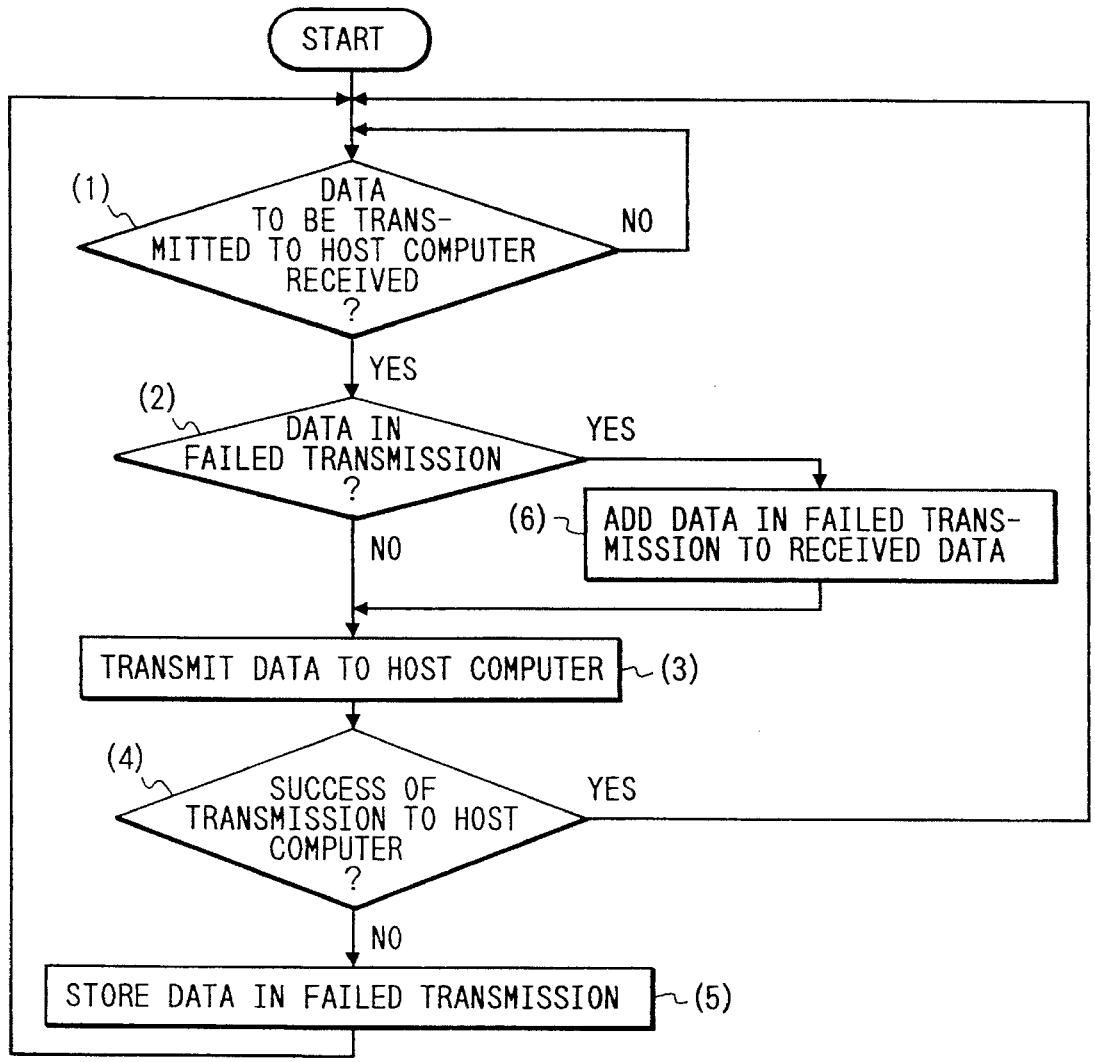
FIG. 10 is a flowchart showing an example of a third communication processing procedure with the communication control unit as shown in FIG. 1.

FIG. 10 is a flowchart showing an example of a third communication processing procedure with the communication control unit 101 as shown in FIG. 1. Note that (1) to (6) shows each step, and this flowchart shows the operation of a software of the communication control unit.

First, a CPU 200 waits for data from the copying machine 1000 in the idle state (1). If data is received, previous data in failed transmission within the RAM 204 is checked (2), and if any, the data in failed transmission is added to the data received from a copy control unit 100 (6), its resulting data being transmitted to the host computer 102 (3). Thereafter, the success of transmission to the host computer 102 is checked (4), in which if the data transmission fails, the data is stored in the RAM 204 (5). Then, the procedure returns to step (1) to repeat the processing.

In the above embodiments, if the communication control unit fails to transmit data to the host computer, the data in failed transmission is temporarily stored in the storage device within the communication control unit, and the data within the storage device is transmitted upon occurrence of a specific event of the copying machine, so that the data can be necessarily transmitted to the host computer even if the communication control unit fails in data transmission.

While the above embodiments have been described with the management data as the data representing the abnormal condition, it should be noted that the management data may be the information concerning the copying machine to be managed on the host computer side, constituted of the data to be supplied to each copying machine and the inherent data.

Further, while in the above embodiments, the copying machine has been exemplified, it will be appreciated that other image forming devices such as a printer may be also usable.

Also, the host computer 102 may be installed within the premises where the copying machine 1000 is placed, or within a service center which is located at the remote side.

Also, the second communication line 104 may be a telephone line, or may be LAN or WAN.

What is claimed is:

1. A monitor system for monitoring a state of an image forming device, comprising:

detector means for detecting the state of the image forming device; and transmitter means for transmitting status data representing the state to a monitor device upon a state change being detected by said detector means, said transmitter means including holding means for holding the status data in accordance with a failure of transmission of the status data, wherein said transmitter means transmits the status data held by said holding means in accordance with a new state change detected by said detector means.

2. A monitor system according to claim 1, wherein said transmitter means includes nonvolatile storage means for storing the status data.

3. A monitor system according to claim 1, wherein said transmitter means transmits the status data stored and the new status data simultaneously.

4. A monitor system according to claim 1, wherein said transmitter means transmits the status data to said monitor device via a public line.

5. A monitor system according to claim 1, wherein said transmitter means stores the time data indicating time when the state change has occurred, and transmits the time data with the status data.

6. A monitor system according to claim 1, wherein said transmitter means transmits the status data when the image forming device has malfunctioned.

7. A monitor system according to claim 6, wherein the status data is data indicating an abnormal state of the image forming device.

8. A monitor system according to claim 1, wherein said detector means detects a signal from the image forming device at a predetermined time interval; and said transmitter means transmits the status data even when said detector means detects no signal after elapse of the predetermined time.

9. A monitor method for monitoring the state of an image forming device, comprising the steps of:

detecting the state of the image forming device; and transmitting status data representing the state to a monitor device upon a state change being detected, with the transmitting step including the step of holding the status data in accordance with a failure of transmission of the status data and transmitting the held status data in accordance with a detected new state change of the image forming device.

10. A monitor method according to claim 9, wherein the transmitting step includes the step of storing the status data in a nonvolatile memory.

11. A monitor method according to claim 9, wherein the transmitting step includes the step of transmitting the status data stored and the new status data simultaneously.

12. A monitor method according to claim 9, wherein the transmitting step includes the step of transmitting the status data to the monitor device via a public line.

13. A monitor method according to claim 9, wherein the transmitting step includes the step of storing time data indicating the time when the state change has occurred, and transmitting the time data with the status data.

14. A monitor method according to claim 9, wherein the transmitting step includes the step of transmitting the status data when the image forming device has malfunctioned.

15. A monitor method according to claim 14, wherein the status data is data indicating an abnormal state of the image forming device.

16. A monitor method according to claim 9, wherein the detecting step includes the step of detecting a signal from the image forming device at a predetermined time interval; and the transmitting step includes the step of transmitting the status data even when the detecting step detects no signal after an elapse of the predetermined time.

17. A transfer device for transferring the state of an image forming device to a monitor device, comprising:

receiver means for receiving status data representing the state in the image forming device; and transmitter means for transmitting the status data to the monitor device upon a change of the status data being received by said receiver means, said transmitter means including holding means for holding the status data in accordance with a failure of transmission of the status data, wherein said transmitter means transmits the status data held by said holding means in accordance with a new state change received by said receiver means.

18. A transfer device according to claim 17, wherein said transmitter means includes a nonvolatile storage means for storing the status data.

19. A transfer device according to claim 17, wherein said transmitter means transmits the status data stored and the new status data simultaneously.

20. A transfer device according to claim 17, wherein said transmitter means transmits the status data to said monitor device via a public line.

21. A transfer device according to claim 17, wherein said transmitter means stores time data indicating the time when the state change has occurred, and transmits the time data with the status data.

22. A transfer device according to claim 17, wherein said transmitter means transmits the status data when the image forming device has malfunctioned.

23. A transfer device according to claim 22, wherein the status data is data indicating an abnormal state of said image forming device.

24. A transfer device according to claim 17, wherein said receiver means receives a signal from the image forming device at a predetermined time interval; and said transmitter means transmits the status data even when said receiver means receives no signal after an elapse of the predetermined time.

* * * * *

UNITED STATES PATENT AND TRADEMARK OFFICE
CERTIFICATE OF CORRECTION

PATENT NO. : 5,600,403
DATED : February 4, 1997
INVENTOR(S) : Inoo

It is certified that error appears in the above-indentified patent and that said Letters Patent is hereby corrected as shown below:

COLUMN 6:

Line 23, "the" should be deleted, and "time" (second occurrence) should read --the time--.

Signed and Sealed this

Twelfth Day of August, 1997

Attest:

BRUCE LEHMAN

*Attesting Officer*       *Commissioner of Patents and Trademarks*